(12) United States Patent
Niles (10) Patent No.: US 11,472,504 B2
(45) Date of Patent: Oct. 18, 2022

(54) BICYCLE SADDLES WITH AN ISCHIAL-PERINEAL SUSPENSION REGION

(71) Applicant: David Niles, Eugene, OR (US)

(72) Inventor: David Niles, Eugene, OR (US)

( * ) Notice: Subject to any disclaimer, the term of this patent is extended or adjusted under 35 U.S.C. 154(b) by 14 days.

(21) Appl. No.: 17/098,263

(22) Filed: Nov. 13, 2020

(65) Prior Publication Data

US 2022/0153373 A1 May 19, 2022

(51) Int. Cl.
*B62J 1/08* (2006.01)
*B62J 1/26* (2006.01)

(52) U.S. Cl.
CPC .. *B62J 1/26* (2013.01); *B62J 1/08* (2013.01)

(58) Field of Classification Search
CPC ..................................... B62J 1/26; B62J 1/08
See application file for complete search history.

(56) References Cited

U.S. PATENT DOCUMENTS

| | | | | |
|---|---|---|---|---|
| 5,165,752 A * | 11/1992 | Terry | .......................... | B62J 1/26 297/202 |
| 6,116,684 A | 9/2000 | Williams | | |
| 6,666,507 B1 * | 12/2003 | Ringgard | ................... | B62J 1/00 297/195.1 |
| 7,044,540 B2 | 5/2006 | Bigolin | | |
| 7,059,674 B2 * | 6/2006 | Garland | ..................... | B62J 1/00 297/202 |
| 8,308,234 B2 | 11/2012 | Segato | | |
| 9,446,808 B2 * | 9/2016 | Marui | ......................... | B62J 1/08 |
| 9,751,580 B2 | 9/2017 | Bigolin | | |
| 10,358,181 B2 * | 7/2019 | Toll | ............................ | B62J 1/08 |
| 10,814,927 B2 * | 10/2020 | Hsu | ............................ | B62J 1/08 |
| 2010/0225148 A1 | 9/2010 | Segato | | |
| 2012/0242119 A1 * | 9/2012 | Bigolin | ...................... | B62J 1/24 297/195.1 |
| 2018/0290703 A1 * | 10/2018 | Li | ........................... | B62J 1/002 |

FOREIGN PATENT DOCUMENTS

EP      2170688 B1    10/2011

OTHER PUBLICATIONS

Selle Royal S.P.A., "Aliante R3", www.fizik.com/us_en/aliante-r3.html, retrieved Nov. 13, 2020.

* cited by examiner

*Primary Examiner* — Philip F Gabler (57) ABSTRACT

A bicycle saddle with an ischial-perineal suspension region may include a monolithic frame, a flexible lamina stretched across and attached to the frame, a cushion on the lamina, and a cover over the cushion. The frame may include a mounting rail configured to attach to a seat post of a bicycle, a seat rail, a nose, and an open region circumscribed by the seat rail and the nose. The seat rail may include a rear rail that forms an arc-shape, a first side rail that forms a first trough, and a second side rail that forms a second trough. The nose may extend from the seat rail and/or the mounting rail. The open region may be an ischial-perineal suspension region. The flexible lamina may be stretched over the open region. The cushion may be disposed on the lamina over the open region.

13 Claims, 8 Drawing Sheets

BICYCLE SADDLES WITH AN ISCHIAL-PERINEAL SUSPENSION REGION

BACKGROUND

Bicycles and various other apparatuses may include a seat that is situated between the legs of a user. When the seat is positioned between the user's legs and the user rests the user's body weight on the seat, pressure may be created on the user's ischium, body tissue around the ischium, and/or the user's perineum. Such pressure may cause physiological conditions such as discomfort, pain, chafing, swelling, difficulty walking or sitting after using the seat, and so forth. Bicycle seat pain and/or discomfort may discourage some people from becoming more avid cyclists. Bicycle seat pain and/or discomfort may negatively impact a cyclist's performance.

BRIEF DESCRIPTION OF DRAWINGS

The present description will be understood more fully when viewed in conjunction with the accompanying drawings of various examples of bicycle saddles with an ischial-perineal suspension region. The description is not meant to limit the bicycle saddles with the ischial-perineal suspension region to the specific examples. Rather, the specific examples depicted and described are provided for explanation and understanding of the bicycle saddles with the ischial-perineal suspension region. Throughout the description the drawings may be referred to as drawings, figures, and/or FIGs.

DETAILED DESCRIPTION

Bicycle saddles with an ischial-perineal suspension region as disclosed herein will become better understood through a review of the following detailed description in conjunction with the figures. The detailed description and figures provide merely examples of the various embodiments of the bicycle saddles with an ischial-perineal suspension region. Many variations are contemplated for different applications and design considerations; however, for the sake of brevity and clarity, all the contemplated variations may not be individually described in the following detailed description. Those skilled in the art will understand how the disclosed examples may be varied, modified, and altered and not depart in substance from the scope of the examples described herein.

Throughout the following detailed description, examples of various bicycle saddles with an ischial-perineal suspension region are provided. Related elements in the examples may be identical, similar, or dissimilar in different examples. For the sake of brevity and clarity, related elements may not be redundantly explained in multiple examples. Instead, the use of a same, similar, and/or related element names and/or reference characters may cue the reader that an element with a given name and/or associated reference character may be similar to another related element with the same, similar, and/or related element name and/or reference character in an example explained elsewhere herein. Elements specific to a given example may be described regarding that particular example. A person having ordinary skill in the art will understand that a given element need not be the same and/or similar to the specific portrayal of a related element in any given figure or example in order to share features of the related element.

As used herein "same" means sharing all features and "similar" means sharing a substantial number of features or sharing materially important features even if a substantial number of features are not shared. As used herein "may" should be interpreted in a permissive sense and should not be interpreted in an indefinite sense. Additionally, use of "is" regarding examples, elements, and/or features should be interpreted to be definite only regarding a specific example and should not be interpreted as definite regarding every example. Furthermore, references to "the disclosure" and/or "this disclosure" refer to the entirety of the writings of this document and the entirety of the accompanying illustrations, which extends to all the writings of each subsection of this document, including the Title, Background, Brief description of the Drawings, Detailed Description, Claims, Abstract, and any other document and/or resource incorporated herein by reference.

As used herein regarding a list, "and" forms a group inclusive of all the listed elements. For example, an embodiment described as including A, B, C, and D is an embodiment that includes A, includes B, includes C, and also includes D. As used herein regarding a list, "or" forms a list of elements, any of which may be included. For example, an embodiment described as including A, B, C, or D is an embodiment that includes any of the elements A, B, C, and D. Unless otherwise stated, an embodiment including a list of alternatively-inclusive elements does not preclude other embodiments that include various combinations of some or all of the alternatively-inclusive elements. An embodiment described using a list of alternatively-inclusive elements includes at least one element of the listed elements. However, an embodiment described using a list of alternatively-inclusive elements does not preclude another embodiment that includes all of the listed elements. And, an embodiment described using a list of alternatively-inclusive elements does not preclude another embodiment that includes a combination of some of the listed elements. As used herein regarding a list, "and/or" forms a list of elements inclusive alone or in any combination. For example, an embodiment described as including A, B, C, and/or D is an embodiment that may include: A alone; A and B; A, B and C; A, B, C, and D; and so forth. The bounds of an "and/or" list are defined by the complete set of combinations and permutations for the list.

Where multiples of a particular element are shown in a FIG., and where it is clear that the element is duplicated throughout the FIG., only one label may be provided for the element, despite multiple instances of the element being present in the FIG. Accordingly, other instances in the FIG. of the element having identical or similar structure and/or function may not have been redundantly labeled. A person having ordinary skill in the art will recognize based on the disclosure herein redundant and/or duplicated elements of the same FIG. Despite this, redundant labeling may be included where helpful in clarifying the structure of the depicted example embodiments.

A conventional bicycle saddle may include a hard, inflexible shell with a cover and/or some padding disposed between the shell and the cover. A performance bicycle saddle may have a narrow front portion and a somewhat broader back portion. The back portion may be broad enough that the back portion is positioned under a rider's left and right ischia. The back portion may be narrow enough that the back portion is positioned between the rider's ischia. A performance bicycle saddle may have a cutout in the shell and/or the cover that aligns with the rider's perineum when the rider sits on the bicycle saddle. A bicycle saddle for more casual or leisurely use may have a shell and cover with a thick layer of padding between the shell and cover. The padding and/or cover may be indented along a portion of the bicycle saddle that is under the rider's perineum as the rider sits on the bicycle saddle. A bicycle saddle for casual or leisurely use may include a frame that attaches to a seat post of a bicycle, a narrow front surface, and a wide back surface. A shell made of leather and/or a similar synthetic material may be stretched between and attached to the front surface and the back surface.

Conventional bicycle saddles do not effectively address the negative physiological effects on a rider of using the conventional bicycle saddles. For example, having a cutout in the saddle only increases an amount of pressure on the rider's posterior in areas where the saddle does not have a cutout. The broad back end of a performance bicycle saddle may lead to significant posterior pain for the rider because of the pressure exerted on the rider's posterior by the hard, inflexible shell. A narrower back end only serves to increase an amount of pressure on the areas of the rider's posterior that sit on the saddle. Similarly, more leisurely saddles with a thick cushion and a hard shell are still limited in the amount of cushioning by the hard shell. The indented portions of the cushion similarly cause and increase in pressure on the areas of the rider's posterior not aligned with the indented portions. Furthermore, most casual and/or leisure-type saddles are ineffective for performance use because the broad back end is incompatible with a prone riding position. In general, conventional saddles are uncomfortable and generally lead to pain for avid riders and casual riders alike. Thus, there is significant room for improvement over the conventional solutions.

Implementations of bicycle saddles as described herein may address one or more of the shortcomings of conventional saddles as described above. A bicycle saddle according to the present disclosure may include a monolithic frame, a flexible lamina stretched across and attached to the frame, a cushion on the lamina, and a cover over the cushion. The frame may include a mounting rail configured to attach to a seat post of a bicycle, a seat rail having a lateral diameter in a range from 10 mm to 20 mm, a nose, and an open region circumscribed by the seat rail and the nose. The seat rail may include a rear rail that forms an arc-shape, a first side rail that forms a first trough, and a second side rail that forms a second trough. The nose may extend from the seat rail and/or the mounting rail. The open region may be an ischial-perineal suspension region. The open region may have a first diameter that extends from the first side rail to the second side rail, the first diameter in a range from 100 mm to 200 mm. The open region may have a second diameter that extends from the rear rail to the nose, the second diameter in a range from 100 mm to 240 mm. The flexible lamina may be stretched over the open region. The cushion may be disposed on the lamina over the open region.

The open region may allow the flexible lamina to flex under the weight of a rider. The flexion of the lamina may provide suspension for the rider's ischium and perineum. The flexion of the lamina may dampen an amount of compression of the cushion under the rider's weight. In a conventional saddle, the amount of cushion provided by the padding may have a hard stop at the shell. However, implementations of bicycle saddles disclosed here, which may include an ischial-perineal suspension region, may dampen a compression of the cushion. For example, as the lamina flexes under the weight of the rider, the compression of the cushion under the rider's weight may be less than when compared with a hard-shell saddle or even a leather saddle. The open region and flexible lamina may therefore increase a cushioning effect of the cushion, thereby increasing the comfort of the rider. Furthermore, the monolithic frame may allow forces on the bicycle saddle due to the rider's weight and/or the rider's weight bouncing on the bicycle saddle to be distributed across the entire frame, instead of concentrating such forces on the rider's posterior as with previous bicycle seats such as those with hard seats or those with cutouts. The size and shape of a bicycle saddle with an ischial-perineal suspension region may be adapted for casual and/or leisure riders, performance riders, riders of different sizes and weights, and so forth.

Figure 1A:
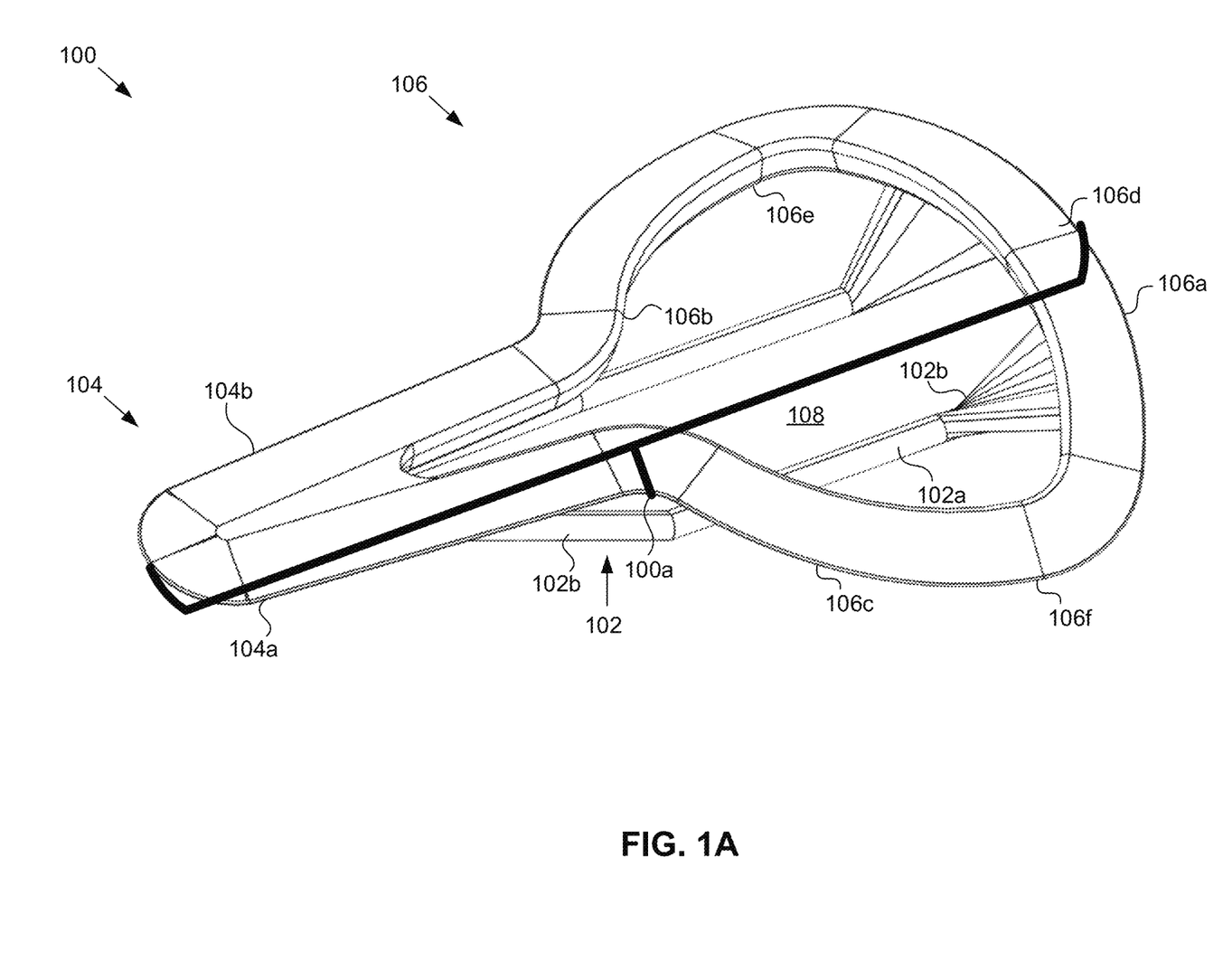
FIG. 1A illustrates a top perspective view of a bicycle saddle frame, according to an embodiment.

FIG. 1A illustrates a top perspective view of a bicycle saddle frame 100, according to an embodiment. Some of the features in FIG. 1A may be the same as or similar to some of the features in the other FIGs. described herein as noted by same and/or similar reference characters, unless expressly described otherwise. Additionally, reference may be made to features shown in any of the other FIGs. described herein and not shown in FIG. 1A.

As used herein, various elements of implementations of bicycle saddles with ischial-perineal suspension regions may be described using terms related to human physiology. A bicycle saddle may be used by a rider in a particular orientation relative to the rider's body. Because the bicycle saddle may be used in such an orientation, it may be conceptually convenient to describe the bicycle saddle, including the various elements of the bicycle saddle, with regard to such orientation. Accordingly, various views and/or cross-sections may be referred to as coronal (i.e. parallel to a vertical plane that divides the human body into ventral and dorsal sections), sagittal (i.e. parallel to a plane that divides the human body into left and right parts), and/or transverse (i.e. parallel to a plane that divides the human body into top and bottom parts). Various sides of the bicycle saddle may be referred to as the right side (i.e. on the rider's right side), the left side (i.e. on the rider's left side), front/forward (i.e. towards the rider's ventral side), and/or rear/back (i.e. towards the rider's dorsal side). Various directions may be referred to as up (i.e. away from the ground) or down (i.e. toward the ground). Various elements of bicycle saddles described herein may be referred to by the corresponding human physiological structures the elements support as a rider sits on and/or otherwise uses the bicycle saddle.

The bicycle saddle frame 100 may include various sections and/or elements. The elements of the bicycle saddle frame 100 may include a mounting rail 102, a nose 104, a seat rail 106, and an ischial-perineal region 108. The bicycle saddle frame 100 may be a single, monolithic unit (i.e. the various portions of the bicycle saddle frame 100 are continuous with each other as a single structure). For example, the elements of the bicycle saddle frame 100 may be formed of a same material and/or may be continuous with each other. Elements of the bicycle saddle frame 100 may be formed simultaneously in a mold. The mold may be a plastic injection mold. The mold may be a fiber-resin mold. The mold may be a thermoplastic mold. The mold may be a die for casting metal. The bicycle saddle frame 100 may be a single unit where the elements of the bicycle saddle frame 100 are joined together. Various of the elements of the bicycle saddle frame 100 may be formed of the same or different materials and may be integrally joined together. For example, the mounting rail 102 may be formed of a first material such as steel or aluminum and the seat rail 106 may be formed of a second material such as carbon fiber. The mounting rail 102 may be joined to the carbon fiber in a mold for the seat rail 106. The carbon fiber may be cured onto the mounting rail 102 material to join the mounting rail 102 and the seat rail 106. Elements of the bicycle saddle frame 100 may be distinct and may be joined by adhesives, screws, pins, and so forth.

The elements of the bicycle saddle frame 100 may each be formed of the same material. Various of the elements of the bicycle saddle frame 100 may be formed of different materials. The materials forming the elements of the bicycle saddle frame 100 may include a metal, a cured fiber-impregnated resin, and/or a plastic. The metal materials may include one or more of steel, titanium, tungsten, aluminum, and so forth. The resin may include one or more of a thermoset resin, a thermoplastic resin, a polymeric resin, a ceramic resin, a metallic resin, and so forth. The fiber material may include one or more of glass, carbon, aramid, boron, polyethylene, and so forth. The plastic may include acrylic, acrylonitrile butadiene styrene (ABS), polylactic acid (PLA), polyvinyl chloride (PVC), and so forth.

The bicycle saddle frame 100 may include one mounting rail 102, two mounting rails 102, three mounting rails 102, or four mounting rails 102. The number of mounting rails 102 may correspond to the number of points at which the bicycle saddle frame 100 mounts to the bicycle seat post. The mounting rail 102 may arc downward and face upward (i.e. an inside of the arc faces up and an outside of the arc faces down). The mounting rail 102 may form an upward-facing arc between a rear segment of the seat rail 106 and the nose 104. The mounting rail 102 may be configured in shape and/or dimension to attach to a seat post of a bicycle. For example, the mounting rail 102 may include a mounting section 102a configured in shape, size, and/or orientation to be attached by a seat clamp to the seat post. The mounting rail 102 may include a forward section 102b that extends upwards and/or away from the mounting section 102a. The mounting rail 102 may include a rear section 102c that extends upwards and/or away from the mounting section 102a. The mounting rail 102 may have a lateral diameter in a range from 5 mm to 50 mm, from 10 mm to 20 mm, or the mounting rail 102 may have a lateral diameter of approximately 10 mm. As used herein, lateral may refer to a width of an element. Diameter may refer to a cross-sectional dimension of an element. Width may refer to the shortest dimension of the element. Thickness may refer to a third dimension that is shorter than the width and is perpendicular to the width and the length. Length may refer to the longest dimension of the element. Longitudinal may refer to the length of the element. Height may refer to a vertical (i.e. perpendicular to a ground surface) dimension of the element.

The nose 104 may extend from the forward section 102b of the mounting rail 102. The nose 104 may extend forward and away from the forward section 102b. The nose 104 may extend from the seat rail 106. The nose 104 may extend forward and away from the seat rail 106. The nose 104 may have a ridge 104a and a surface 104b. The ridge 104a may outline the nose 104 along the edge of the bicycle saddle frame 100. The surface 104b may extend from the right side of the bicycle saddle frame 100 to a left side of the bicycle saddle frame 100. The nose 104 may have a greater side-to-side (e.g. left-to-right) width than the mounting rail 102. The surface 104b of the nose 104 may be approximately planar. The surface 104b may be curved upwards (i.e. convex). The surface 104b may be curved downwards (i.e. concave).

The seat rail 106 may extend from the rear section 102c of the mounting rail 102 to the nose 104. The seat rail 106 may extend along a first side (e.g. a right side) of the bicycle saddle frame 100 and/or along a second side (e.g. a right side) of the bicycle saddle frame 100 between the rear section 102c of the mounting rail 102 and the nose 104. The seat rail 106 may include a rear rail 106a, a right rail 106b, and a left rail 106c. The rear rail 106a may form an arc-shape. The arc shape may face downward such that in inside of the arc shape is down and an outside of the arc shape is up. The arc-shape may include an apex 106d. The right rail 106b may extend from the rear rail 106a. The right rail 106b may extend from the rear rail 106a to the nose 104. The right rail 106b may extend to a right side of the nose 104. The right rail 106b may extend to a left side of the nose 104. The right rail 106b may form a right trough 106e. The right trough 106e may be a low point of the right rail 106b. The right trough 106e may be along the right side of the bicycle saddle frame 100 and between the rear rail 106a and the nose 104. The left rail 106c may extend from the rear rail 106a. The left rail 106c may extend from the rear rail 106a to the nose 104. The left rail 106c may extend to a left side of the nose 104. The left rail 106c may extend to a right side of the nose 104. The left rail 106c and the right rail 106b may cross before extending to the nose 104. The left rail 106c and the right rail 106b may join at or before the nose 104. The left rail may form a left trough 106f. the left trough 106f may be a low point of the left rail 106c. The left trough 106f may be along the left side of the bicycle saddle frame 100 and between the rear rail 106a and the nose 104. The right trough 106e may face up. The left trough 106f may face up.

The ischial-perineal region 108 may be an open space and/or region formed by the bicycle saddle frame 100 that aligns under the ischia and/or perineum of the rider. The ischial-perineal region 108 may be circumscribed by the seat rail 106 and the nose 104. The ischial-perineal region 108 may have a widest coronal width 108a between the left trough 106f and the right trough 106e. The widest coronal width 108a may be closer to the rear rail 106a than to the nose 104. The widest coronal width 108a may be ⅕ the distance from the rear rail 106a to the nose 104, ¼ the distance from the rear rail 106a to the nose 104, ⅓ the distance from the rear rail 106a to the nose 104, and so forth. The ischial-perineal region 108 may have a widest sagittal width 108b that extends from the apex 106d to the nose 104. The widest sagittal width 108b may be aligned approximately equally between the left side and right side of the bicycle saddle frame 100. The left and right sides of the bicycle saddle frame 100 may be isometric. The left side of the bicycle saddle frame 100 may mirror the right side.

The widest coronal width 108a may be in a range from 100 mm to 200 mm, from 110 mm to 190 mm, from 120 mm to 180 mm, from 130 mm to 170 mm, from 140 mm to 160 mm, and/or from 145 mm to 155 mm. The widest coronal width 108a may be approximately 120 mm or approximately 140 mm. The widest sagittal width 108b may be in a range from 100 mm to 240 mm, from 110 mm to 230 mm, from 120 mm to 220 mm, from 130 mm to 210 mm, from 140 mm to 200 mm, from 150 mm to 190 mm, from 160 mm to 180 mm, and/or from 165 mm to 175 mm. A greatest length 100a of the bicycle saddle frame 100 from the back side the front side of the bicycle saddle frame 100 (i.e. from the back side of the rear rail 106a to the front side of the nose 104) may be in a range from 220 mm to 260 mm. The greatest length 100a may be approximately 245 mm or approximately 230 mm. When the widest coronal width 108a is approximately 140 mm, the greatest length 100a of the bicycle saddle frame 100 may be approximately 245 mm. When the widest coronal width 108a is approximately 120 mm, the greatest length 100a of the bicycle saddle frame 100 may be approximately 230 mm.

Figure 1B:
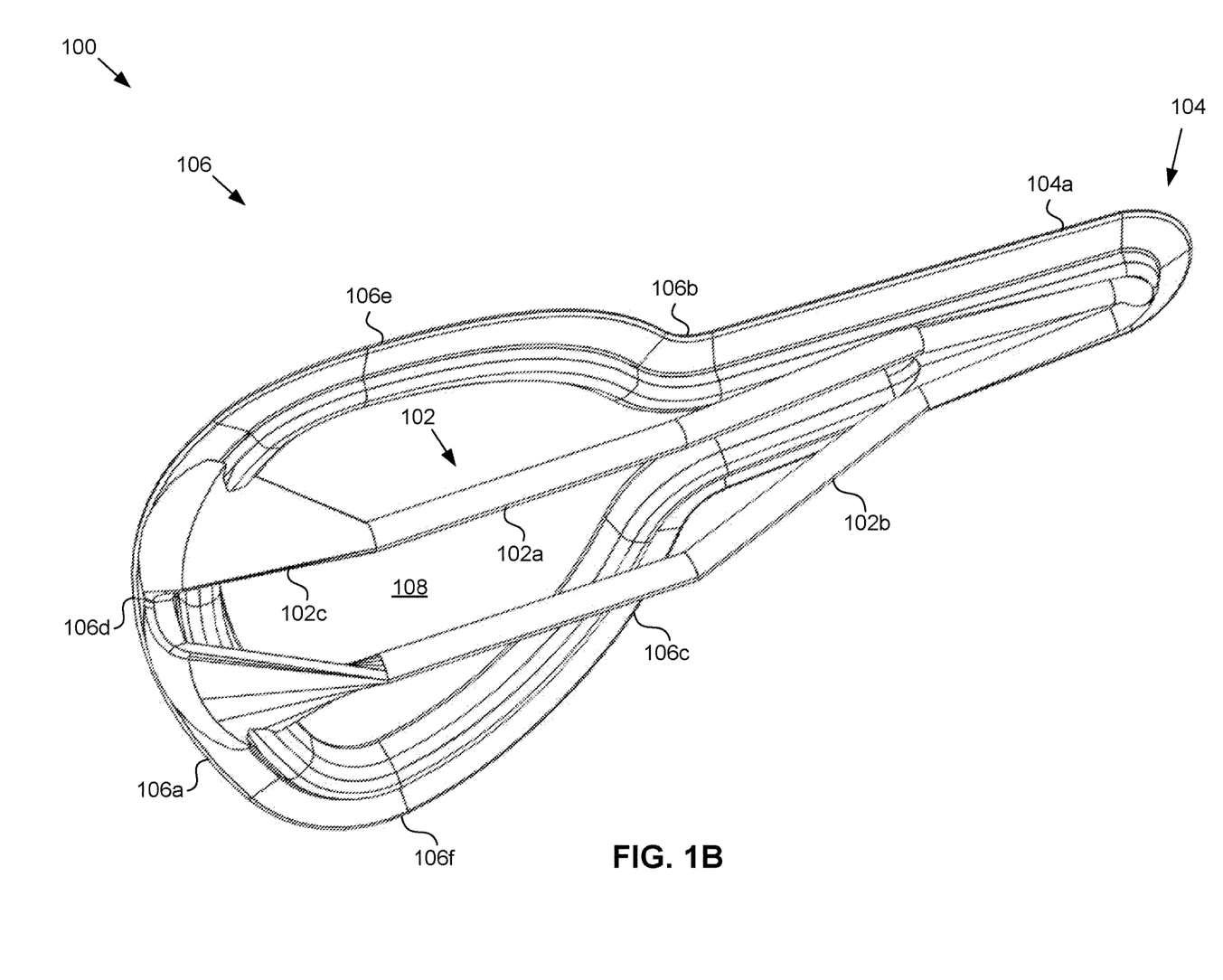
FIG. 1B illustrates a bottom perspective view of the bicycle saddle frame, according to an embodiment.

FIG. 1B illustrates a bottom perspective view of the bicycle saddle frame 100, according to an embodiment. Some of the features in FIG. 1B may be the same as or similar to some of the features in the other FIGs. described herein as noted by same and/or similar reference characters, unless expressly described otherwise. Additionally, reference may be made to features shown in any of the other FIGs. described herein and not shown in FIG. 1B.

The bicycle saddle frame 100 may include continuous transitions between the mounting rail 102 and the nose 104, the mounting rail 102 and the seat rail 106, and/or between the seat rail 106 and the nose 104. The mounting rail 102 may be continuous with the seat rail 106. The mounting rail 102 may be continuous with the nose 104. The mounting rail 102 may arc downward from the seat rail 106 and the nose 104. Various surfaces of the elements of the bicycle saddle frame 100 may be continuous with each other such that the elements are seamless. For example, a flat underside surface of the bicycle saddle frame 100 that forms an underside edge of the bicycle saddle frame 100 may be continuous from a front side of the nose 104 to a rear side of the seat rail 106. The mounting section 102a of the mounting rail 102 may be continuous with the forward section 102b. The rear section 102c of the mounting rail 102 may be continuous with the mounting section 102a. The forward section 102b of the mounting rail 102 may be continuous with the nose 104. The rear section 102c of the mounting rail 102 may be continuous with the seat rail 106, such as with the rear rail 106a of the seat rail 106. The seat rail 106 may be continuous with the nose 104. The nose 104 may extend from and be continuous with the forward section 102b of the mounting rail, the right rail 106b of the seat rail 106, and/or the left rail 106c of the seat rail 106.

Figure 2A:
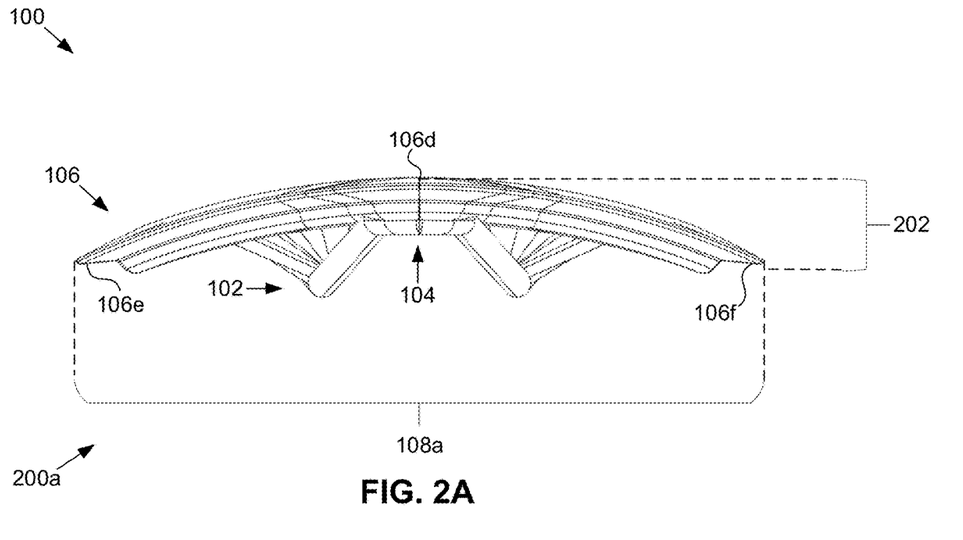
FIG. 2A illustrates a front coronal view of the bicycle saddle frame, according to an embodiment.

FIG. 2A illustrates a front coronal view 200a of the bicycle saddle frame 100, according to an embodiment. Some of the features in FIG. 2A may be the same as or similar to some of the features in the other FIGs. described herein as noted by same and/or similar reference characters, unless expressly described otherwise. Additionally, reference may be made to features shown in any of the other FIGs. described herein and not shown in FIG. 2A.

In the front coronal view 200a, the nose 104 and the apex 106d of the seat rail 106 are between the right trough 106e and the left trough 106f. In the front coronal view 200a, the widest coronal width 108a is visible relative to a coronal width 104c of the nose 104. The coronal width 104c of the nose 104 may be in a range from 30 mm to 60 mm, from 30 mm to 50 mm, from 30 mm to 40 mm, or from 35 mm to 45 mm.

Figure 2B:
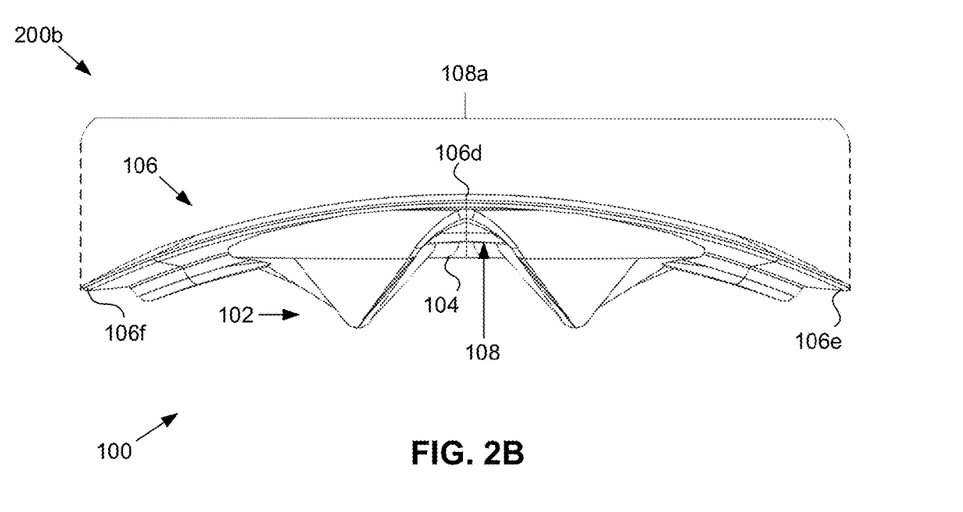
FIG. 2B illustrates a rear coronal view of the bicycle saddle frame, according to an embodiment.

FIG. 2B illustrates a rear coronal view 200b of the bicycle saddle frame 100, according to an embodiment. Some of the features in FIG. 2B may be the same as or similar to some of the features in the other FIGs. described herein as noted by same and/or similar reference characters, unless expressly described otherwise. Additionally, reference may be made to features shown in any of the other FIGs. described herein and not shown in FIG. 2B.

In the rear coronal view 200b of the bicycle saddle frame 100, the arc of the rear rail 106a as the rear rail 106a transitions to the right rail 106b and the left rail 106c is visible. The right trough 106e and/or the left trough 106f has a depth 202 below a level of the apex 106d of the rear rail 106a. The depth 202 may be in a range from 20 mm to 80 mm, from 30 mm to 70 mm, and/or from 40 mm to 60 mm. The depth 202 may be approximately 50 mm.

Figure 3:
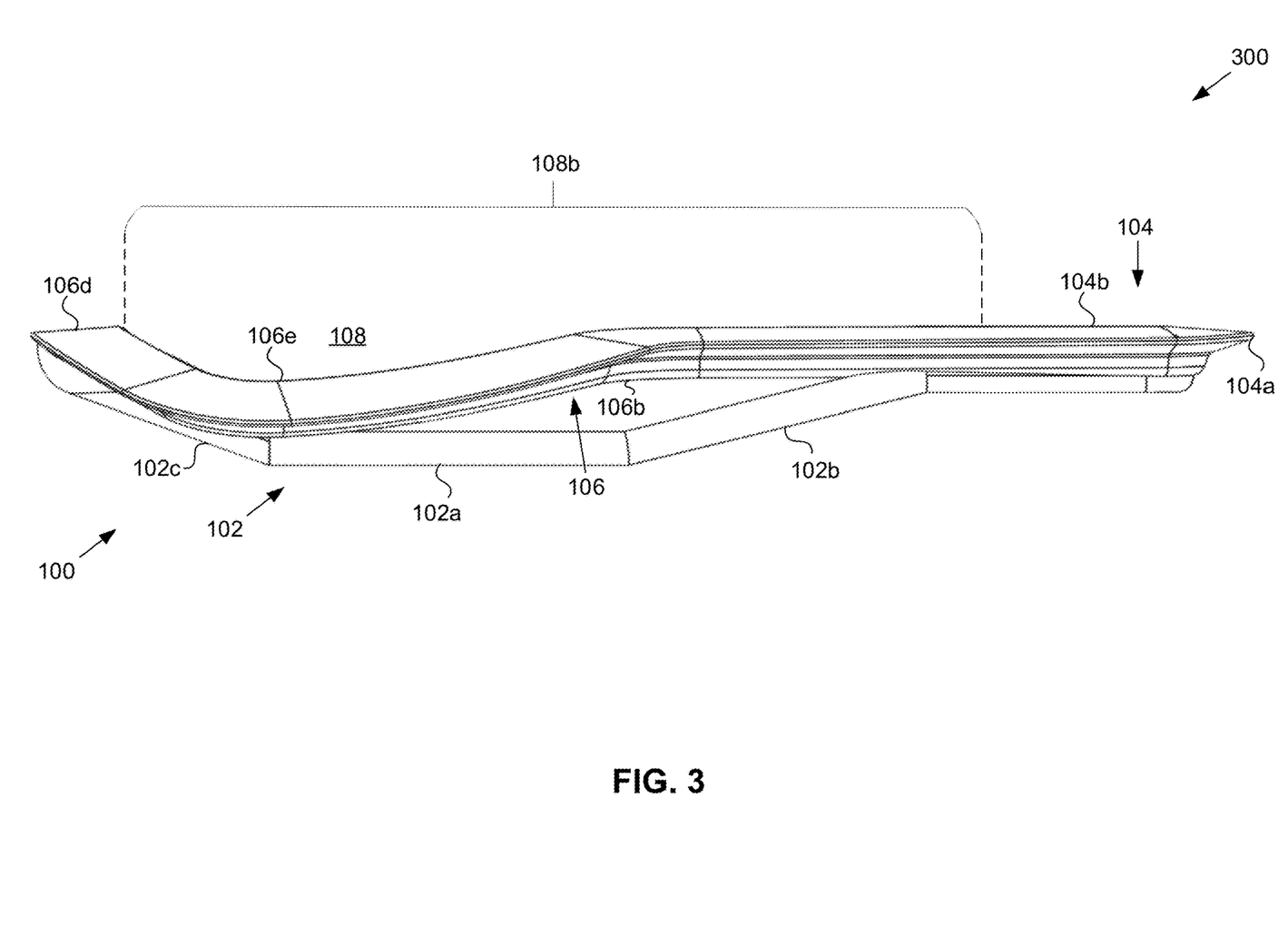
FIG. 3 illustrates a sagittal view of the bicycle saddle frame, according to an embodiment.

FIG. 3 illustrates a sagittal view 300 of the bicycle saddle frame 100, according to an embodiment. Some of the features in FIG. 3 may be the same as or similar to some of the features in the other FIGs. described herein as noted by same and/or similar reference characters, unless expressly described otherwise. Additionally, reference may be made to features shown in any of the other FIGs. described herein and not shown in FIG. 3.

In the sagittal view 300, the right trough 106e (and the left trough 106f, which is hidden by the right trough 106e in the sagittal view 300) are between the apex 106d and the nose 104. In the sagittal view 300, the right trough 106e and/or the left trough 106f may be forward of the apex 106d in a range from 40 mm to 130 mm, from 50 mm to 120 mm, from 60 mm to 110 mm, from 70 mm to 100 mm, and/or from 80 mm to 90 mm.

Figure 4A:
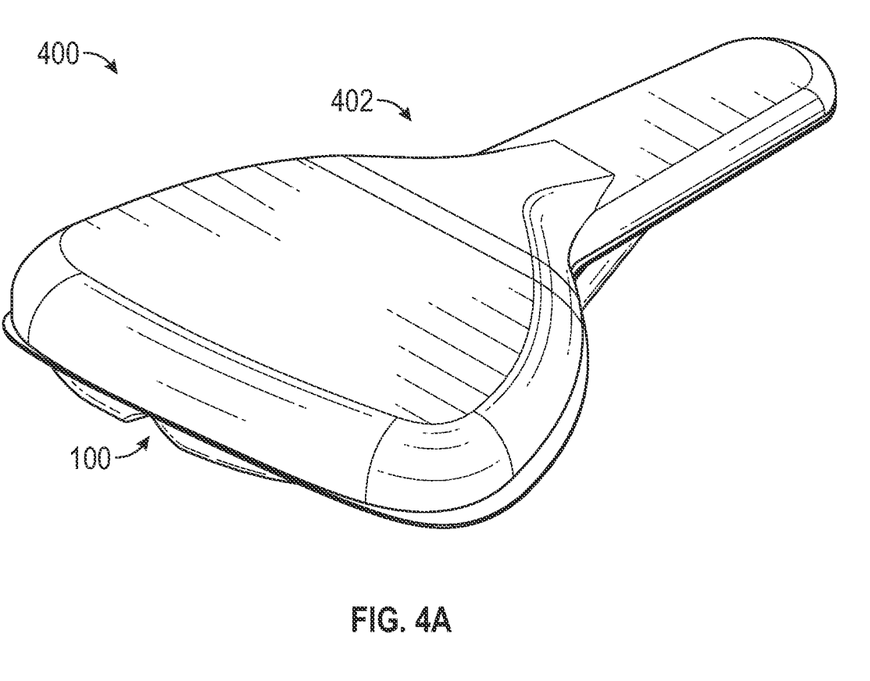
FIG. 4A illustrates a top perspective view of a bicycle saddle, according to an embodiment.

FIG. 4A illustrates a top perspective view of a bicycle saddle 400, according to an embodiment. Some of the features in FIG. 4A may be the same as or similar to some of the features in the other FIGs. described herein as noted by same and/or similar reference characters, unless expressly described otherwise. Additionally, reference may be made to features shown in any of the other FIGs. described herein and not shown in FIG. 4A.

The bicycle saddle 400 may include the bicycle saddle frame 100 and a seat 402. The seat 402 may be attached to the bicycle saddle frame 100. The seat 402 may be formed of flexible materials. The flexible materials may be stretched over and/or attached to the bicycle saddle frame 100. The bicycle saddle frame 100 may provide structural support for the seat 402. The bicycle saddle frame 100 may enable the seat 402 to support the rider as the rider sits on the bicycle saddle 400.

Figure 4B:
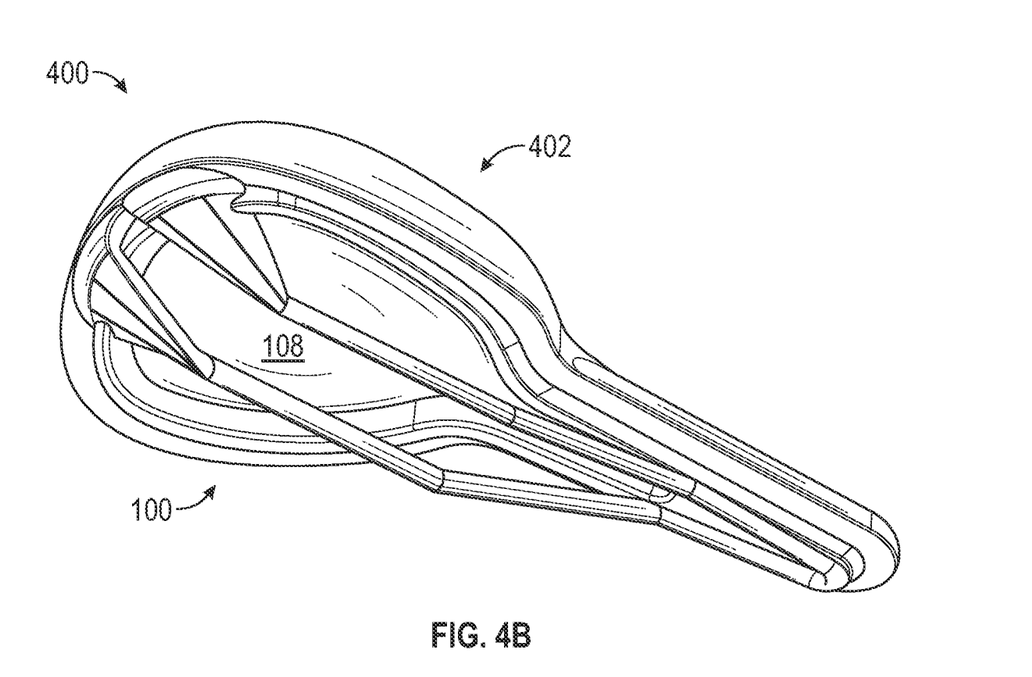
FIG. 4B illustrates a bottom perspective view of the bicycle saddle, according to an embodiment.

FIG. 4B illustrates a bottom perspective view of the bicycle saddle 400, according to an embodiment. Some of the features in FIG. 4B may be the same as or similar to some of the features in the other FIGs. described herein as noted by same and/or similar reference characters, unless expressly described otherwise. Additionally, reference may be made to features shown in any of the other FIGs. described herein and not shown in FIG. 4B.

The seat 402 may extend across the ischial-perineal region 108 in the bicycle saddle frame 100. The seat 402 may attach to the seat rail 106 and/or the nose 104. The ischial-perineal region 108 may provide suspension for the rider's posterior because the ischial-perineal region 108 is open and does not have a hard stop. This may significantly reduce the impulse on the rider's posterior as the rider's weight on the seat 402 changes, such as when the rider goes from standing to sitting or when the rider travels over bumps. Furthermore, because there is not a hard stop as with conventional bicycle saddles having a hard shell, the rider's weight is distributed more evenly over the rider's posterior, rather than be concentrated on the rider's ischia and perineum.

Figure 5:
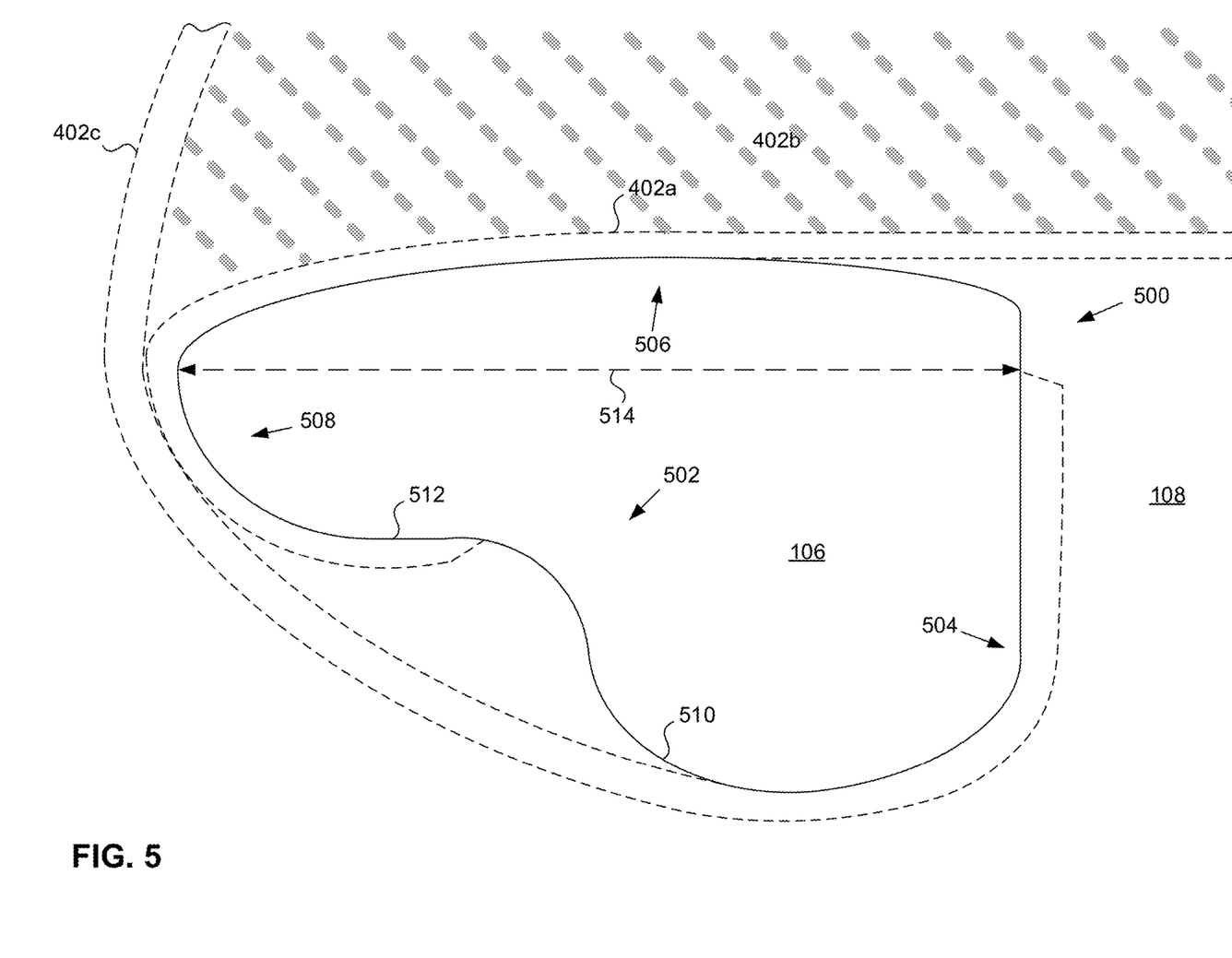
FIG. 5 illustrates a cross-section of a seat rail of the bicycle saddle frame, according to an embodiment.

FIG. 5 illustrates a cross-section 500 of the seat rail 106 of the bicycle saddle frame 100, according to an embodiment. Some of the features in FIG. 5 may be the same as or similar to some of the features in the other FIGs. described herein as noted by same and/or similar reference characters, unless expressly described otherwise. Additionally, reference may be made to features shown in any of the other FIGs. described herein and not shown in FIG. 5.

The seat rail 106 may have an underside 502, an inside edge 504 (i.e. adjacent to the ischial-perineal region 108), a top side 506, and an outside edge 508 opposite the inside edge 504. The seat rail 106 may include a rounded surface 510 along the underside 502. The rounded surface 510 may be adjacent to the inside edge 504 of the seat rail 106. The seat rail 106 may include a flat surface 512 along the underside 502 of the seat rail 106. The flat surface 512 may be adjacent to the outside edge 508 of the seat rail 106. The top side 506 of the seat rail 106 may be flat or rounded.

The seat rail 106 may have a widest lateral diameter 514 that extends from the inside edge 504 to the outside edge 508. The widest lateral diameter 514 may be in a range from 5 mm to 20 mm, from 10 mm to 15 mm, from 10 mm to 20 mm, and/or from 5 mm to 15 mm. The widest lateral diameter 514 may be approximately 5 mm, approximately 8 mm, approximately 10 mm, approximately 12 mm, approximately 15 mm, or approximately 20 mm. The widest lateral diameter 514 may be at the apex 106d, at the right trough 106e, and/or at the left trough 106f. The seat rail 106 may have a uniform lateral diameter such that the lateral diameter of the rear rail 106a, the right rail 106b, and the left rail 106c are the same. The seat rail 106 may have a variable diameter such that the diameter of one or more sections of the seat rail 106 is different than the diameter of one or more other sections of the seat rail 106.

The cross-section 500 may show various layers of the seat 402. The seat 402 may include a lamina 402a, a cushion 402b, and/or a cover 402c. The seat may include one, two, or three of these layers. For example, the seat 402 may be formed of the cushion 402b without the lamina 402a or the cover 402c. The seat 402 may be formed of the lamina 402a without the cushion 402b or the cover 402c. The seat 402 may be formed of the lamina 402a and the cover 402c without the cushion 402b. And so forth.

The lamina 402a may be stretched over the ischial-perineal region 108 and attached to the underside 502 of the seat rail 106 and/or the nose 104. The lamina 402a may be attached to the top side 506 of the seat rail 106 and/or the surface 104b of the nose 104. The lamina may be attached to the flat surface 512 on the underside 502 of the seat rail and/or the nose 104. The lamina may be wrapped around the outside edge 508 and the underside 502 of the seat rail 106 and attached to an inside surface (i.e. adjacent to the inside edge 504 and the ischial-perineal region 108) of the seat rail 106. The lamina 402a may be stretched so that the lamina 402a is taut without stretching the fibers and/or cross-linkages of the lamina 402a. This may enable the lamina 402a to flex and/or stretch under the weight of the rider without breaking the fibers and/or cross-linkages of the lamina 402a. The lamina 402a may be waterproof. The lamina 402a may be made of a vinyl polymer and/or a microsynthetic polymer. The lamina 402a may have a thickness in a range from 0.1 mm to 3 mm, from 0.5 mm to 2.5 mm, from 0.75 mm to 2 mm, or from 1 mm to 1.5 mm.

Figure 6:
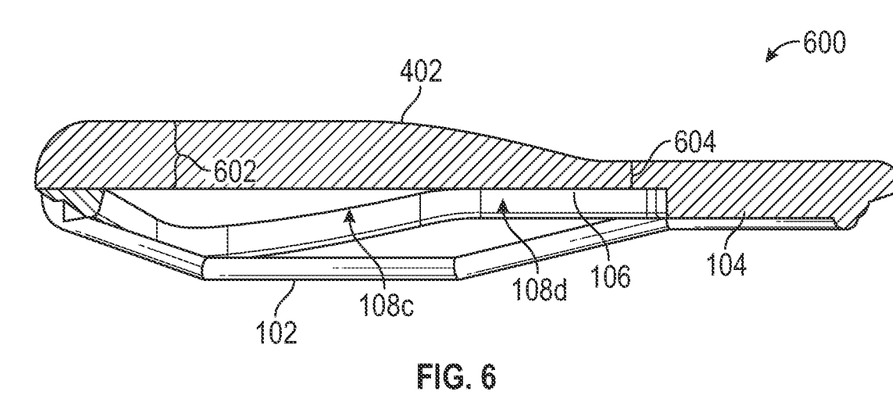
FIG. 6 illustrates a sagittal cross-section view of the bicycle saddle, according to an embodiment.

FIG. 6 illustrates a sagittal cross-section view 600 of the bicycle saddle 400, according to an embodiment. Some of the features in FIG. 6 may be the same as or similar to some of the features in the other FIGs. described herein as noted by same and/or similar reference characters, unless expressly described otherwise. Additionally, reference may be made to features shown in any of the other FIGs. described herein and not shown in FIG. 6.

The cushion 402b may be confined to placement on the lamina 402a over the ischial-perineal region 108. The cushion 402b may be placed on the lamina 402a over the ischial-perineal region 108 and the nose 104 but not the seat rail 106. The cushion 402b may be placed on the lamina 402a over some portions of the seat rail 106 and not others. The cushion 402b may be formed of an ethylene-vinyl acetate (EVA) foam and/or a polyurethane foam. The cushion 402b may have a first thickness 602 over an ischial portion 108c of the ischial-perineal region 108. The first thickness may be in a range from 15 mm to 25 mm, from 10 mm to 30 mm, and/or from 20 mm to 30 mm. The first thickness 602 may be approximately 20 mm. The cushion 402b may have a second thickness 604 over the nose 104. The second thickness 604 may be in a range from 2 mm to 10 mm, from 2 mm to 8 mm, from 3 mm to 10 mm, and/or from 4 mm to 6 mm. The second thickness 604 may be approximately 5 mm. The cushion 402b may have a tapered thickness that tapers from the ischial-perineal region 108 or the ischial portion 108c to the nose 104. The thickness of the cushion 402b may taper over a perineal portion 108d of the ischial-perineal region 108. A slope of the tapered thickness of the cushion may be sharp, in a range from 100% to 200% (i.e. the percentage of rise to run). The slope may be gradual, in a range from greater than 20% to less than 100%. The slope may be soft, in a range from 20% to 30%. The slope may be approximately 25%. When the first thickness 602 is approximately 25 mm and the second thickness 604 is approximately 5 mm, the slope may be approximately 25%. The thickness may taper over a specific area, where other areas of the cushion 402b have constant thickness. The thickness of the cushion 402b may taper continuously from the rear rail 106a to the front of the nose 104.

Figure 7:
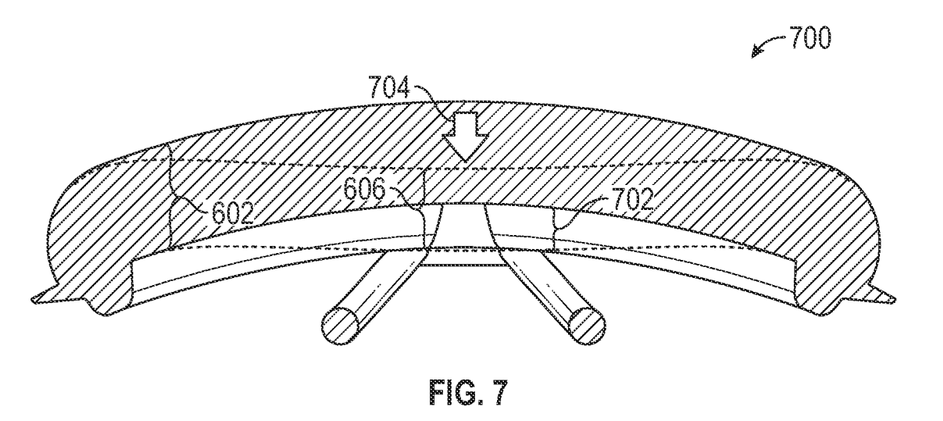
FIG. 7 illustrates a rear coronal cross-section view of the bicycle saddle supporting the weight of a rider, according to an embodiment.

FIG. 7 illustrates a rear coronal cross-section view 700 of the bicycle saddle 400 supporting the weight of a rider, according to an embodiment. Some of the features in FIG. 7 may be the same as or similar to some of the features in the other FIGs. described herein as noted by same and/or similar reference characters, unless expressly described otherwise. Additionally, reference may be made to features shown in any of the other FIGs. described herein and not shown in FIG. 7.

The lamina 402a, the cushion 402b, and/or the cover 402c may be configured to (e.g. may be made of a material and/or may be stretched taut enough to) flex by an amount 702 in a range from 5 mm to 50 mm. The amount 702 of flex may correspond to the weight of a rider exerting a force 704 on the seat 402. As the weight of the rider exerts the force 704 on the seat 402, the cushion 402b may compress from the first thickness 602 to a compressed thickness 606 of the cushion 402b. An amount of compression of the cushion 402b may be dampened by the amount of flex of the lamina 402a (i.e. if the same amount of force were exerted on the cushion 402b as the cushion was against a rigid, inflexible surface, the cushion 402b would compress more).

The above description sets forth numerous specific details such as examples of specific systems, components, methods and so forth, in order to provide a good understanding of several implementations. It will be apparent to one skilled in the art, however, that at least some implementations may be practiced without these specific details. In other instances, well-known components or methods are not described in detail or are presented in simple block diagram format in order to avoid unnecessarily obscuring the present implementations. Thus, the specific details set forth above are merely exemplary. Particular implementations may vary from these exemplary details and still be contemplated to be within the scope of the present implementations.

It is to be understood that the above description is intended to be illustrative and not restrictive. Many other implementations will be apparent to those of skill in the art upon reading and understanding the above description. The scope of the present implementations should, therefore, be determined with reference to the appended claims, along with the full scope of equivalents to which such claims are entitled.

The disclosure above encompasses multiple distinct embodiments with independent utility. While these embodiments have been disclosed in a particular form, the specific embodiments disclosed and illustrated above are not to be considered in a limiting sense as numerous variations are possible. The subject matter of the embodiments includes the novel and non-obvious combinations and sub-combinations of the various elements, features, functions and/or properties disclosed above and inherent to those skilled in the art pertaining to such embodiments. Where the disclosure or subsequently filed claims recite "a" element, "a first" element, or any such equivalent term, the disclosure or claims is to be understood to incorporate one or more such elements, neither requiring nor excluding two or more of such elements.

Applicant(s) reserves the right to submit claims directed to combinations and sub-combinations of the disclosed embodiments that are believed to be novel and non-obvious. Embodiments embodied in other combinations and sub-combinations of features, functions, elements and/or properties may be claimed through amendment of those claims or presentation of new claims in the present application or in a related application. Such amended or new claims, whether they are directed to the same embodiment or a different embodiment and whether they are different, broader, narrower or equal in scope to the original claims, are to be considered within the subject matter of the embodiments described herein.

The invention claimed is:

1. An apparatus, comprising:
a bicycle saddle frame, wherein:
the bicycle saddle frame is a single, monolithic unit such that elements of the bicycle saddle frame are formed of a same material and are continuous with each other; and
the elements of the bicycle saddle frame comprise:
a mounting rail configured to attach to a seat post of a bicycle, the mounting rail comprising:
a mounting section configured in shape, size, and orientation to be attached by a seat clamp to the seat post;
a forward section that extends upwards from the mounting section; and
a rear section that extends upwards from the mounting section;
a nose extending from the forward section of the mounting rail;
a seat rail extending from the rear section of the mounting rail to the nose along a first side of the bicycle saddle frame and a second side of the bicycle saddle frame, the seat rail comprising:
a rounded surface along an underside of the seat rail adjacent to an inside edge of the seat rail;
a flat surface along the underside of the seat rail adjacent to an outside edge of the seat rail;
a rear portion that is arced;
an apex formed by the seat rail at the rear portion;
a first trough formed by the seat rail along the first side of the bicycle saddle frame; and
a second trough formed by the seat rail along the second side of the bicycle saddle frame,
wherein, regarding the seat rail:
the seat rail has a lateral diameter at the first trough, the second trough, and the apex in a range from 5 mm to 20 mm;
the first trough and the second trough are between the apex and the nose in a sagittal view of the bicycle saddle frame;
the nose and the apex of the rear portion are between the first trough and the second trough in a coronal view of the bicycle saddle frame; and
the first trough and the second trough have a depth below a level of the apex in the coronal view or the sagittal view, the depth in a range from 20 mm to 80 mm; and
an ischial-perineal region circumscribed by the seat rail and the nose, wherein:
the ischial-perineal region is an open space in the bicycle saddle frame that aligns with an ischium and a perineum of a rider;
the ischial-perineal region has a coronal width that extends from the first trough to the second trough, the coronal width in a range from 100 mm to 200 mm; and
the ischial-perineal region has a sagittal width that extends from the apex to the nose, the sagittal width in a range from 100 mm to 240 mm;
wherein, regarding the elements of the bicycle saddle frame,
the flat surface is continuous along the underside of the outside edge of the bicycle saddle frame from a front side of the nose to a rear side of the seat rail;
the mounting section of the mounting rail is continuous with the forward section and the rear section of the mounting rail;
the forward section of the mounting rail is continuous with the nose;
the rear section of the mounting rail is continuous with the seat rail; and
the seat rail is continuous with the nose;
a flexible and waterproof lamina attached to the flat surface along the underside of the edge of the bicycle saddle frame and extending over the ischial-perineal region, wherein:
the lamina is configured to flex throughout the ischial-perineal region to provide suspension for a posterior of the rider; and the lamina is configured to flex by an amount in a range from 5 mm to 20 mm, the amount of flex corresponding to a weight of the rider exerting a force on the lamina;
a cushion disposed on the lamina and over the ischial-perineal region and the nose, wherein:
the cushion has a first thickness over an ischial portion of the ischial-perineal region, wherein the first thickness is in a range from 10 mm to 30 mm;
the cushion has a second thickness over the nose, wherein the second thickness is in a range from 2 mm to 10 mm; and
a slope of the cushion from the ischial portion to the nose is in a range from 10% to 20%; and
a cover over the cushion such that the cushion is disposed between the cover and the lamina, wherein the cover is attached to the lamina along the flat surface that is along the underside of the edge of the bicycle saddle frame.

2. The apparatus of claim 1, wherein:
the cushion comprises an ethylene-vinyl acetate (EVA) foam or a polyurethane foam;
the lamina comprises a vinyl polymer or a first micro synthetic polymer; and
the cover comprises leather or a second micro synthetic polymer, wherein:
the second micro synthetic polymer is the same as the first micro synthetic polymer; or
the second micro synthetic polymer is different from the first micro synthetic polymer.

3. The apparatus of claim 1, wherein:
the lateral diameter is 10 mm;
a length from the rear portion of the seat rail to a front portion of the nose is:
in a range from 220 mm to 260 mm;
230 mm;
245 mm; or
the coronal width of the ischial-perineal region is:
140 mm; or
120 mm.

4. The apparatus of claim 1, wherein:
as the weight of the rider exerts the force on the lamina, the cushion compresses; and
an amount of compression of the cushion is dampened by the amount of flex of the lamina.

5. The apparatus of claim 1, wherein:
the first thickness of the cushion is 15 mm to 20 mm;
the second thickness of the cushion is 5 mm to 10 mm; or
the slope of the cushion is 15%.

6. The apparatus of claim 1, wherein:
a length from the rear portion of the seat rail to a front of the nose is 230 mm and the coronal width of the ischial-perineal region is 120 mm; or
the length from the rear portion of the seat rail to the front of the nose is 245 mm and the coronal width of the ischial-perineal region is 140 mm.

7. An apparatus, comprising:
a bicycle saddle frame, wherein:
the bicycle saddle frame is a single, monolithic unit; and
elements of the bicycle saddle frame comprise:
a mounting rail configured to attach to a seat post of a bicycle, the mounting rail comprising:
a mounting section configured in shape, size, and orientation to be attached by a seat clamp to the seat post;
a forward section that extends upwards from the mounting section; and
a rear section that extends upwards from the mounting section;
a nose extending from the mounting rail, the first side rail, and the second side rail;
a seat rail extending from the rear section of the mounting rail to the nose along a first side of the bicycle saddle frame and a second side of the bicycle saddle frame, the seat rail comprising:
a rounded surface along an underside of the seat rail adjacent to an inside edge of the seat rail;
a flat surface along the underside of the seat rail adjacent to an outside edge of the seat rail;
a rear portion that is arced;
an apex formed by the seat rail at the rear portion;
a first trough formed by the seat rail along the first side of the bicycle saddle frame; and
a second trough formed by the seat rail along the second side of the bicycle saddle frame,
wherein, regarding the seat rail:
the seat rail has a lateral diameter at the first trough, the second trough, and the apex in a range from 5 mm to 20 mm;
the first trough and the second trough are between the apex and the nose in a sagittal view of the bicycle saddle frame;
the nose and the apex of the rear portion are between the first trough and the second trough in a coronal view of the bicycle saddle frame; and
the first trough and the second trough have a depth below a level of the apex in the coronal view or the sagittal view, the depth in a range from 20 mm to 80 mm; and
an ischial-perineal region circumscribed by the seat rail and the nose, wherein:
the ischial-perineal region is an open space in the bicycle saddle frame that aligns with an ischium and a perineum of a rider;
the ischial-perineal region has a coronal width that extends from the first trough to the second trough, the coronal width in a range from 100 mm to 200 mm; and
the ischial-perineal region has a sagittal width that extends from the apex to the nose, the sagittal width in a range from 100 mm to 240 mm;
wherein, regarding the elements of the bicycle saddle frame,
the flat surface is continuous along the underside of the outside edge of the bicycle saddle frame from a front side of the nose to a rear side of the seat rail;
the mounting section of the mounting rail is continuous with the forward section and the rear section of the mounting rail;
the forward section of the mounting rail is continuous with the nose;
the rear section of the mounting rail is continuous with the seat rail; and
the seat rail is continuous with the nose;
a flexible and waterproof lamina attached to the flat surface along the underside of the edge of the bicycle saddle frame and extending over the ischial-perineal region, wherein:

the lamina is configured to flex throughout the ischial-perineal region to provide suspension for a posterior of the rider; and the lamina is configured to flex by an amount in a range from 5 mm to 20 mm, the amount of flex corresponding to a weight of the rider exerting a force on the lamina;

a cushion disposed on the lamina and over the ischial-perineal region and the nose, wherein:

the cushion has a first thickness over an ischial portion of the ischial-perineal region, wherein the first thickness is in a range from 10 mm to 30 mm;

the cushion has a second thickness over the nose, wherein the second thickness is in a range from 2 mm to 10 mm; and a slope of the cushion from the ischial portion to the nose is in a range from 10% to 20%; and a cover over the cushion such that the cushion is disposed between the cover and the lamina, wherein the cover is attached to the lamina along the flat surface that is along the underside of the edge of the bicycle saddle frame.

8. The apparatus of claim 7, wherein
the depth below the level of the apex in the coronal view or the sagittal view, is about 50 mm.

9. The apparatus of claim 7, wherein the mounting rail:
arcs downward; and
extends from the rear rail to the nose.

10. The apparatus of claim 7, wherein
as the weight of the rider exerts the force on the lamina, the cushion compresses; and
an amount of compression of the cushion is dampened by the amount of flex of the lamina.

11. The apparatus of claim 7, wherein the lamina has a thickness in a range from 1 mm to 1.5 mm.

12. The apparatus of claim 11, wherein the lamina or the cover is attached to the flat surface by an adhesive.

13. The apparatus of claim 7, wherein a slope of the tapered thickness of the cushion is:
sharp with a slope ranging from 100% to 200%;
gradual with a slope ranging from greater than 20% to less than 100%; or
soft with a slope ranging from 10% to 20%.

* * * * *